United States Patent [19]

Steiner

[11] Patent Number: 4,487,284

[45] Date of Patent: Dec. 11, 1984

[54] DEVICE FOR TOWING A MOTORCYCLE
[75] Inventor: Walter Steiner, Meyrin, Switzerland
[73] Assignee: Lacoray S.A., Geneva, Switzerland
[21] Appl. No.: 441,296
[22] Filed: Nov. 12, 1982
[30] Foreign Application Priority Data Nov. 13, 1981 [CH] Switzerland .................. 7297/81

[51] Int. Cl.$^3$ ............................................. B60D 1/02
[52] U.S. Cl. ................................. 180/219; 280/292; 280/504
[58] Field of Search ............... 280/292, 204, 480, 452, 280/504, 24; 180/219

[56] References Cited

U.S. PATENT DOCUMENTS

| 581,309 | 4/1897 | Savell | 280/292 |
| 2,402,104 | 6/1946 | Vaszin | 280/504 |
| 2,705,649 | 4/1955 | Collier | 280/504 |
| 2,721,088 | 10/1955 | Ritter | 280/452 X |

FOREIGN PATENT DOCUMENTS

| 1913373 | 11/1969 | Fed. Rep. of Germany | 280/24 |
| 90227 | 8/1957 | Norway | 280/504 |

Primary Examiner—John A. Pekar
Attorney, Agent, or Firm—Darby & Darby

[57] ABSTRACT

This motorcycle towing device comprises a towing unit body adapted to be fastened detachably or permanently to the front fork of a motorcycle to be towed, a hitching member retained by a spring-loaded bolt responsive to a traction cable connected to a control lever, for example the clutch control lever.

5 Claims, 5 Drawing Figures

1

DEVICE FOR TOWING A MOTORCYCLE

FIELD OF THE INVENTION

The present invention relates to a device for towing a motorcycle.

As a rule, it is prohibited for obvious safety reasons to tow a motorcycle by means of a cable or rope attached to the towed motorcycle in a manner preventing the motorcyclist from quickly releasing the motorcycle from the towing vehicle. Under these conditions, the towed motorcyclist is compelled to hold the towing rope with one hand and to control the motorcycle with the other hand. This way of riding is of course far from satisfactory from the point of view of safety. The rider will tend to form at least one loop with the rope around the handlebar so that he can keep the rope thereon by exerting only a relatively slight pressure with his hand while gripping the handlebar with both hands. In this case, it is most likely that the rope will rapidly work off loose from the towed motorcycle. Moreover, the towed motorcycle is pulled in a direction which is not coaxial therewith, so that unavoidable jerks will cause the handlebar to pivot and the rider to fall.

SUMMARY OF THE INVENTION

It is the essential object of the present invention to provide a device enabling a motorcycle to be towed with the maximum degree of safety, that is, by enabling the motorcyclist to control his machine normally, with both hands, while preserving the possibility of releasing instantaneously the towing cable or rope in case of danger, this cable or rope being furthermore attached to the motorcycle at a point disposed at least substantially on the pivot axis of the front fork.

For this purpose, the towing device according to this invention is characterized in that it comprises a towing unit body adapted to be mounted detachably or permanently to the front fork of the motorcycle, and a hitching member slidably fitted in the towing unit body and retained therein by a bolt connected to one end of a traction cable having its opposite end provided with means for anchoring same to a control lever.

Preferably, the traction cable is attached to the clutch control lever in the same fashion as the clutch cable, either in the same nipple as this clutch cable or in a second nipple parallel thereto. This arrangement is particularly advantageous for in case of danger the first reflex of a motorcyclist is to actuate the brake lever and the clutch lever for declutching. Thus, the towing cable is released simultaneously with the braking and declutching action.

The hitching member may also consist of a hook or a loop. This hook or loop may if desired be fixed permanently to the end of the towing cable.

An attractive form of embodiment consists in utilizing the existing T-member of the fork as a coupling bar.

DESCRIPTION OF THE PREFERRED FORMS OF EMBODIMENT

Figure 1:
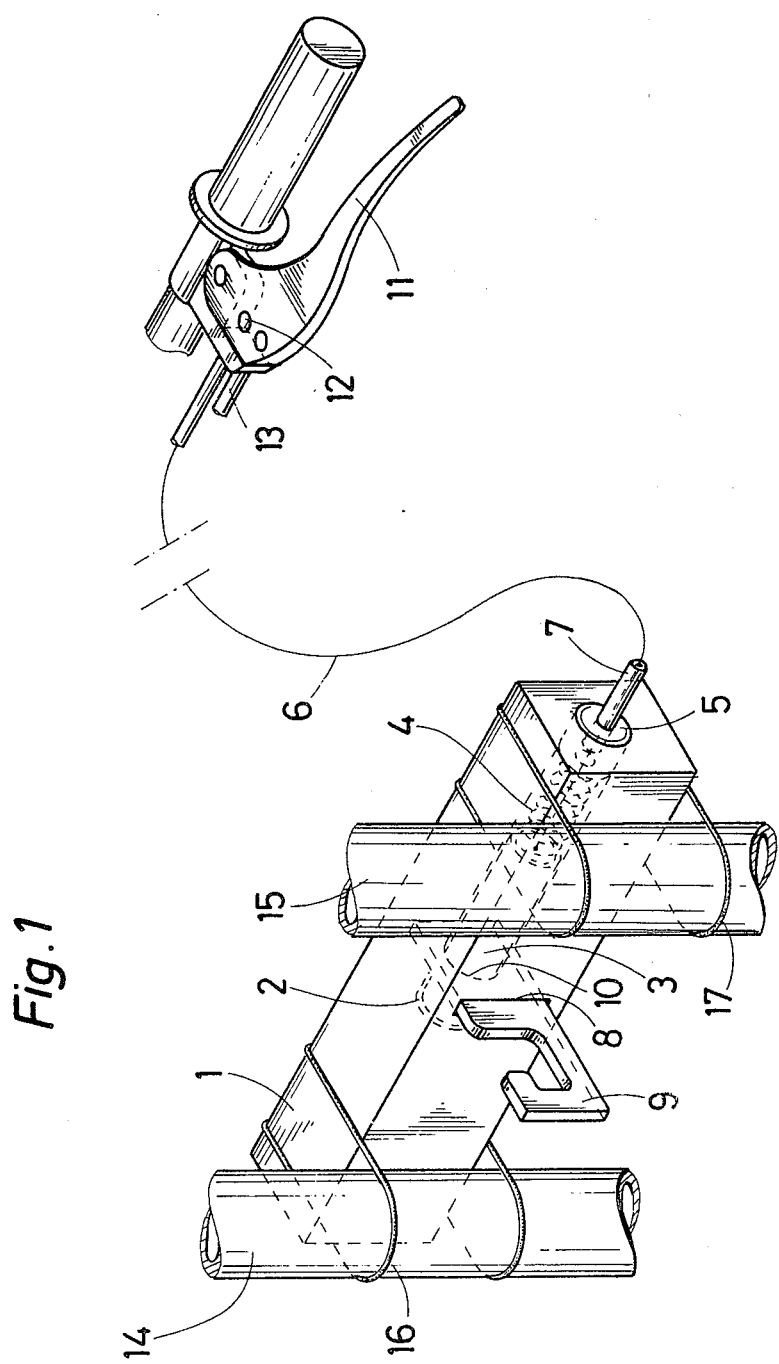
FIG. 1 illustrates in perspective view, with parts broken away, a first form of embodiment of the towing device of this invention.

The device illustrated in FIG. 1 comprises a towing unit body 1 consisting of a simple parallelipipedic section member having a blind axial hole 2 formed therein at one end for sliding engagement by a cylindrical bolt 3 normally urged to the bottom of the hole 2 by a coil compression spring 4 prestressed between the bolt 3 and a screw plug 5 closing the inlet end of hole 2 and provided with an axial orifice permitting the passage of a traction cable 6 attached to the bolt 3. This cable 6 is protected by a tube 7 of synthetic material along its passage through the plug 5. In addition, the body 1 comprises intermediate its ends a transverse passage 8 freely engaged by a hitching member 9 provided at its inner end with a hole 10 slidably and freely engaged by the inner end of bolt 3. The other end of cable 6 is attached by means of a cable nipple 12 to the clutch control lever 11 mounted to the steering handlebar of the motorcycle, like the clutch cable 13.

In the example illustrated, the towing body 1 is fastened by means of elastic bands 16 and 17, but of course any other suitable and known quick-fitting means may be used for this purpose. A light bond is sufficient since substantially zero stress is exerted thereon in actual use.

The towing cable is attached to the hitching member 9. Since this member 9 is located substantially in the middle of the front fork, just below the T member thereof, the towed motorcycle is towed at a suitable positioned point, at least approximately on the pivot axis of the front wheel, so that the tractive effort exerted on the hitching member cannot transmit any undesired torque on the fork and thus jeopardize the rider's equilibrium. In case of danger, the rider actuates the clutch lever 11 and thus pulls the bolt 3 to release the hitching member 9.

Figure 2:
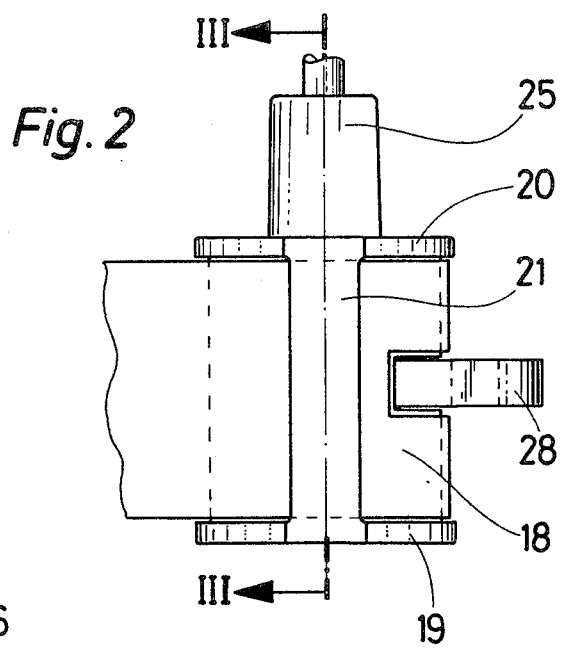
FIG. 2 is a top view showing a second form of embodiment of the device.
Figure 3:
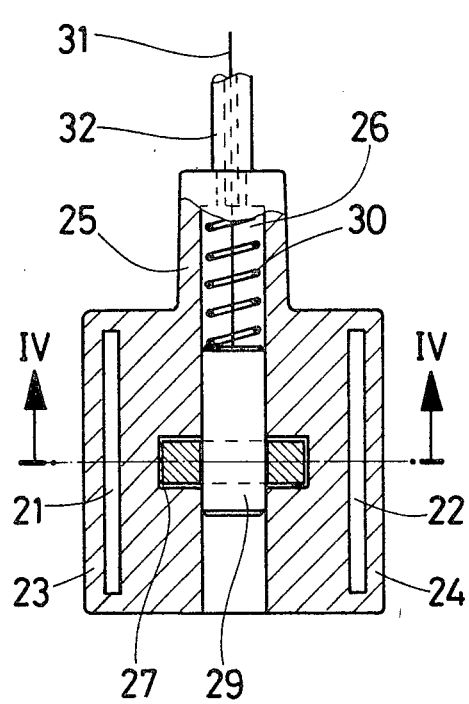
FIG. 3 is an axial section taken along the line III—III of FIG. 2.
Figure 4:
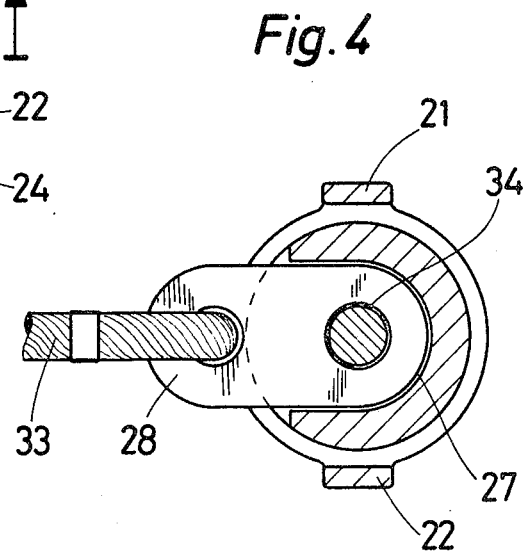
FIG. 4 is a cross section taken along the line IV—IV of FIG. 2.

In the second form of embodiment illustrated in FIGS. 2, 3 and 4, the towing unit body is of substantially cylindrical configuration and made of a suitable synthetic material. It comprises a cylindrical surface 18 bounded at both ends by flanges 19 and 20 interconnected by a pair of diametrally opposite bridges 21 and 22 forming a pair of passages 23 and 24 for a fastening strap 32 adapted to secure the towing unit body to the front fork of the motorcycle.

This body comprises a radial recess 27 freely engaged by a hitching lug 28 to which the towing cable 33 is attached. Engaged in a hole 34 formed through the inner end of this lug 28 is a hollow cylindrical bolt 29 attached to the corresponding end of a traction cable 31. This bolt 29 is adapted to slide axially in a bore 26 and to compress a coil compression spring 30 housed in a cylindrical axial extension 25 of the towing unit body, the end of the sheath 32 of cable 31 reacting against this extension 25.

When the cable 31 is pulled, the bolt 29 is also pulled towards the body extension 25 to free the hitching lug 28.

Of course, the present invention should not be construed as being strictly limited by the specific forms of embodiment shown and described herein, since many changes and modifications may be brought thereto without departing from the basic principles of the invention. Thus, more particularly, the pull cable 6 may be attached to a separate or auxiliary lever fixed to the handlebar in the vicinity of one of the grips. It is also possible to disconnect the clutch cable and fix the pull cable 6 in lieu thereof.

Another variant is to provide a loop instead of a towing or hitching hook. Moreover, this loop could be attached directly to the towing cable. Besides, the towing cable may be mounted on a self-winding drum secured to the rear end of a towing motorcycle. The lock bolt may be of any suitable type, for example sliding, pivoting or articulated. It is notably possible to use a lever-type bolt for increasing the tractive effort exerted on the bolt and facilitating the release of the towing or hitching hook.

The device may be made of a suitable metal or alloy, or partially or wholly of synthetic material. It is particularly advantageous to use a known self-lubricating synthetic material for making the bolt 3.

Figure 5:
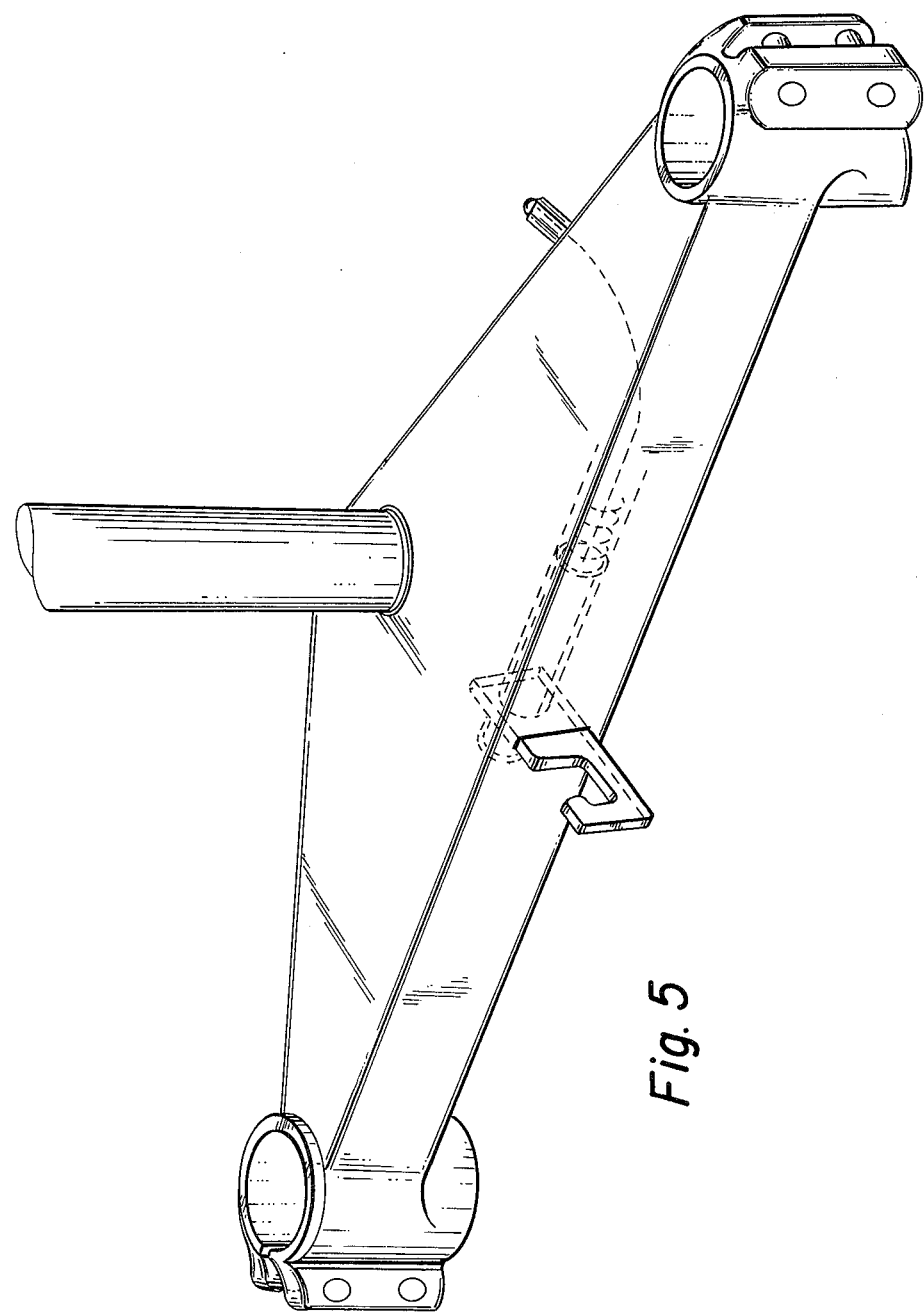
FIG. 5 is a perspective view of the lower T-member of the front fork of a motorcycle, showing its adaptation to the present invention.

The device illustrated and described herein, as well as its modified versions, constitute detaclable accessories, but in a different form of embodiment the towing unit body may be secured as a permanent element to the front fork of the motorcycle. Finally, it is also possible to use the lower T-member of the fork (FIG. 5) as a towing unit body.

What is claimed is:

1. A device for towing a motorcycle, which comprises
    a towing unit body adapted to be fastened to the front fork of the motorcycle to be towed,
    a hitching member slidably fitted in said body,
    a bolt retaining said hitching member in said body,
    a traction cable having one end connected to said bolt and an opposite end, and
    means formed on said opposite end for attachment to a traction lever.

2. The motorcycle towing device of claim 1, wherein said traction lever consists of the clutch control lever of the motorcycle.

3. The motorcycle towing device of claim 1 or 2, wherein said towing unit body comprises the lower T-member of the front fork of the motorcycle.

4. The motorcycle towing device of claim 1 or 2, wherein said towing unit body has a generally cylindrical configuration and said hitching member is formed with a hole therein, and further comprising
    flexible means for attaching said towing unit body to the front fork of the motorcycle and
    resilient means urging said bolt into said hole, said bolt being controllable by said traction cable for withdrawal from said hole, whereby said hitching member is released from said motorcycle.

5. The motorcycle towing device of claim 1 or 2, wherein said towing unit body has a generally prismatic configuration said hitching member is formed with a hole therein, and further comprising
    flexible means for attaching said towing unit body to the front fork of the motorcycle and
    resilient means urging said bolt into said hole, said bolt being controllable by said traction cable for withdrawal from said hole, whereby said hitching member is released from said motorcycle.

* * * * *